United States Patent
Zhou et al.

(10) Patent No.: US 12,530,587 B2
(45) Date of Patent: Jan. 20, 2026

(54) SYSTEMS AND METHODS FOR CONTRASTIVE LEARNING WITH SELF-LABELING REFINEMENT

(71) Applicant: Salesforce, Inc., San Francisco, CA (US)

(72) Inventors: Pan Zhou, Singapore (SG); Caiming Xiong, Menlo Park, CA (US); Chu Hong Hoi, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 1081 days.

(21) Appl. No.: 17/375,728

(22) Filed: Jul. 14, 2021

(65) Prior Publication Data

US 2022/0269946 A1 Aug. 25, 2022

Related U.S. Application Data

(60) Provisional application No. 63/146,170, filed on Feb. 5, 2021.

(51) Int. Cl.
*G06N 3/084* (2023.01)
*G06N 3/04* (2023.01)

(52) U.S. Cl.
CPC ............ *G06N 3/084* (2013.01); *G06N 3/04* (2013.01)

(58) Field of Classification Search
CPC .... G06N 3/084; G06N 3/04; G06F 18/24137; G06F 18/217; G06F 18/2415
See application file for complete search history.

(56) References Cited

U.S. PATENT DOCUMENTS

2019/0236460 A1* 8/2019 Jagota ............... G06N 5/025
2022/0188643 A1* 6/2022 Fukuda ............... G06N 3/088

OTHER PUBLICATIONS

Momentum contrast for unsupervised visual representation learning pp. 9729-9738, 2020 He et al. ("He").*
Simple Multiple Noisy Label Utilization Strategies © 2011 pp. 635-644 (Sheng).*
Momentum contrast for unsupervised visual representation learning pp. 9729-9738, 2020 He et al.*
Everingham et al., "The pascal visual object classes (VOC) challenge," International Journal of Computer Vision, vol. 88, Issue 2, 2010, pp. 303-338.
He et al., "Momentum Contrast for Unsupervised Visual Representation Learning," In Proceedings of the IEEE/CVF Conference on Computer Vision and Pattern Recognition, 2020, pp. 9729-9738.
Kim et al., "MixCo: Mix-up Contrastive Learning for Visual Representation," arxiv, 2020.

(Continued)

*Primary Examiner* — Sherrod L Keaton
(74) *Attorney, Agent, or Firm* — Haynes and Boone, LLP

(57) ABSTRACT

Embodiments described herein provide a contrastive learning mechanism with self-labeling refinement, which iteratively employs the network and data themselves to generate more accurate and informative soft labels for contrastive learning. Specifically, the contrastive learning framework includes a self-labeling refinery module to explicitly generate accurate labels, and a momentum mix-up module to increase similarity between a query and its positive, which in turn implicitly improves label accuracy.

20 Claims, 7 Drawing Sheets

(56) References Cited

OTHER PUBLICATIONS

Lee et al., "i-Mix: A Domain-Agnostic Strategy for Contrastive Representation Learning," arxiv, 2020. 740-755.
Lin et al., "Microsoft COCO: Common objects in context," In European conference on computer vision, 2014, pp. 740-755.
Wu et al., "Detectron 2," available online at <https://github.com/facebookresearch/detectron2>, 2019, 4 pages.

* cited by examiner

300 ⟶

```
┌─────────────────────────────────────────────────────────────────────────┐
│         Receive a Training Batch of Unlabeled Query Samples 302         │
└─────────────────────────────────────────────────────────────────────────┘
                                    ↓
┌─────────────────────────────────────────────────────────────────────────┐
│   Generate, For Each Unlabeled Query, a Positive Instance Paired with the│
│                               Query 304                                 │
└─────────────────────────────────────────────────────────────────────────┘
                                    ↓
┌─────────────────────────────────────────────────────────────────────────┐
│  Compute a first instance probability distribution based on a first     │
│  semantic similarity between the first positive instance and a set of   │
│  positive instances and negative instances generated from the training  │
│                       batch of query samples 306                        │
└─────────────────────────────────────────────────────────────────────────┘
                                    ↓
┌─────────────────────────────────────────────────────────────────────────┐
│  Remove the First Positive Instance Corresponding to the First Unlabeled│
│       Query from the Set of Positive and Negative Instances 308         │
└─────────────────────────────────────────────────────────────────────────┘
                                    ↓
┌─────────────────────────────────────────────────────────────────────────┐
│  Compute a second instance probability distribution based on a second   │
│  semantic similarity between the first positive instance and remaining  │
│     instances in the set of positive instances and negative instances 310│
└─────────────────────────────────────────────────────────────────────────┘
                                    ↓
┌─────────────────────────────────────────────────────────────────────────┐
│  Generate, for the first query sample, a first self-label by combining a│
│  first one-hot label of the first query sample, the first instance      │
│  probability distribution and the second instance probability distribution 312│
└─────────────────────────────────────────────────────────────────────────┘
                                    ↓
┌─────────────────────────────────────────────────────────────────────────┐
│  Generate, by a machine learning model, an encoded output based on a    │
│  contrastive input of the set of positive instances and negative instances│
│                                  314                                    │
└─────────────────────────────────────────────────────────────────────────┘
                                    ↓
┌─────────────────────────────────────────────────────────────────────────┐
│  Compute a Contrastive Loss Objective based at least in part on the     │
│                       Generated Self-Label 316                          │
└─────────────────────────────────────────────────────────────────────────┘
                                    ↓
┌─────────────────────────────────────────────────────────────────────────┐
│  Update the machine learning model based on the contrastive loss        │
│                  objective via backpropagation 318                      │
└─────────────────────────────────────────────────────────────────────────┘
```

*FIG. 3*

Table 1: Classification accuracy (%) on CIFAR10.

| method | KNN | linear evaluation |
|---|---|---|
| MoCo v2 | 92.5 | 93.9 |
| SimCLR | — | 94.0 |
| BYOL | 92.4 | 93.9 |
| CLSA (strong) | 93.4 | 94.9 |
| i-Mix (+MoCo) | — | 95.9 |
| CLEAN | 95.2 | 96.1 |
| CLEAN (strong) | 95.3 | 96.5 |
| Supervised | — | 95.5 |

FIG. 6

Table 2: Top-1 accuracy under the linear evaluation on ImageNet with the ResNet50 backbone.

| augmentation | method (200 epochs) | Top 1 | method (≥800 epochs) | Top 1 |
|---|---|---|---|---|
| weak | MoCo | 60.8 | PIRL-800epochs | 63.6 |
| | SimCLR | 61.9 | CMC | 66.2 |
| | CPC v2 | 63.8 | SimCLR-800epochs | 70.0 |
| | PCL | 65.9 | MoCo v2-800epochs | 71.1 |
| | MoCo v2 | 67.5 | BYOL-1000epochs | 74.3 |
| | CO2 | 68.0 | SimSiam-800epochs | 71.3 |
| | MixCo | 68.4 | i-Mix-800epochs | 71.3 |
| | SWAV-Multi | 72.7 | SWAV-Multi-800epochs | 75.3 |
| | CLEAN-Single | 70.6 | CLEAN-Single-800epochs | 73.0 |
| | CLEAN-Multi | 73.5 | CLEAN-Multi-800epochs | 75.7 |
| strong | CLSA-Single | 69.4 | CLSA-Single-800epochs | 72.2 |
| | CLSA-Multi | 73.3 | CLSA-Multi-800epochs | 76.2 |
| | CLEAN-Single | 70.1 | CLEAN-Single-800epochs | 73.5 |
| | CLEAN-Multi | 73.7 | CLEAN-Multi-800epochs | 76.4 |
| strong + JigSaw | InfoMin Aug | 70.1 | InfoMin Aug-800epochs | 73.0 |
| others | InstDisc | 54.0 | BigBiGAN | 56.6 |
| | LocalAgg | 58.8 | SeLa-400epochs | 61.5 |
| | Supervised | 76.5 | Supervised | 76.5 |

FIG. 7

Table 3: Transfer learning results on downstream tasks.

| method | classification VOC07 Accuracy | object detection VOC07+12 AP$_{50}$ | COCO AP |
|---|---|---|---|
| RotNet | 64.6 | — | — |
| NPID++ | 76.6 | 79.1 | — |
| MoCo | 79.8 | 81.5 | — |
| PIRL | 81.1 | 80.7 | — |
| PCL | 84.0 | — | — |
| BoWNet | 79.3 | 81.3 | — |
| SimCLR | 86.4 | — | — |
| CO2 | 85.2 | 82.7 | — |
| i-Mix | — | 82.7 | — |
| MoCo v2 | 87.1 | 82.5 | 42.0 |
| SWAV-Multi | 88.9 | 82.6 | 42.1 |
| CLSA-Multi(strong) | 93.6 | 83.2 | 42.3 |
| CLEAN-Multi | 92.9 | 82.9 | 42.2 |
| CLEAN-Multi (strong) | 93.7 | 83.4 | 42.4 |
| Supervised | 87.5 | 81.3 | 40.8 |

FIG. 8

Table 4: Effects of the components in CLEAN with strong augmentation to classification accuracy (%) on CIFAR10.

| label $p$ in (5) | label $q$ in (5) | momentum mixup | accuracy |
|---|---|---|---|
| | | | 93.7 |
| ✓ | | | 94.6 |
| | ✓ | | 94.5 |
| | | ✓ | 94.8 |
| ✓ | ✓ | | 94.5 |
| ✓ | | ✓ | 95.2 |
| | ✓ | ✓ | 95.1 |
| ✓ | ✓ | ✓ | 95.9 |

FIG. 9

Table 6: Accuracy (%) of various mixups on ImageNet.

| | MoCo+mixup | MoCo+momentum mixup |
|---|---|---|
| CIFAR10 (weak) | 93.7 | 94.2 |
| CIFAR10 (strong) | 93.3 | 94.8 |
| ImageNet (weak) | 68.4 | 69.0 |

FIG. 10

SYSTEMS AND METHODS FOR CONTRASTIVE LEARNING WITH SELF-LABELING REFINEMENT

CROSS-REFERENCE(S)

The present disclosure is a nonprovisional of and claims priority under 35 U.S.C. 119 to commonly-owned U.S. provisional application No. 63/146,170, filed Feb. 5, 2021, which is hereby expressly incorporated by reference.

TECHNICAL FIELD

The present disclosure relates generally to machine learning models and neural networks, and more specifically, to contrastive learning with self-labeling refinement.

BACKGROUND

Supervised learning for neural models usually require a large amount of manually annotated training data, which can be time-consuming and expensive. Self-supervised learning (SSL), or unsupervised visual representation learning, provide a training mechanism for the neural model to learn features without manual annotations. Such SSL methods can often be successful in many downstream tasks, e.g. image classification and object detection. Specifically, SSL constructs a pretext task that can obtain data labels via designing the task itself, and then builds a network to learn from these tasks. For instance, by constructing jigsaw puzzle, spatial arrangement identification, orientation, or chromatic channels as a pretext task, SSL learns high-quality features from the pretext task that can be well transferred to downstream tasks.

Contrastive learning is a recently developed SSL method, which constructs an instance discrimination pretext task to train a network so that the representations of different augmentations or crops of the same instance are pulled close to each other, while representations of different instances are pushed away from each other. Specifically, for an image crop query, contrastive learning randomly augments the same image to obtain a positive instance and view other image crops as negatives. Then it constructs a one-hot label for instance discrimination over the positive and negative instances to pull the positive pair closer while pushing away negative instances in the feature space. The one-hot labels used in contrastive learning, however, can often be inaccurate and uninformative. This is because a query can often be semantically similar or even more similar to its negative instances than the corresponding positive instances.

Therefore, there is a need to improve the accuracy of contrastive learning.

BRIEF DESCRIPTION OF THE DRAWINGS

FIG. 3 is a simplified logic flow diagram illustrating an aspect of contrastive learning with self-labeling refinement as described in FIGS. 1-2, according to some embodiments.

FIGS. 6-10 provide example tables illustrating performance of the contrastive learning system and/or method described in FIGS. 1-5, according to some embodiments.

Figure 1:
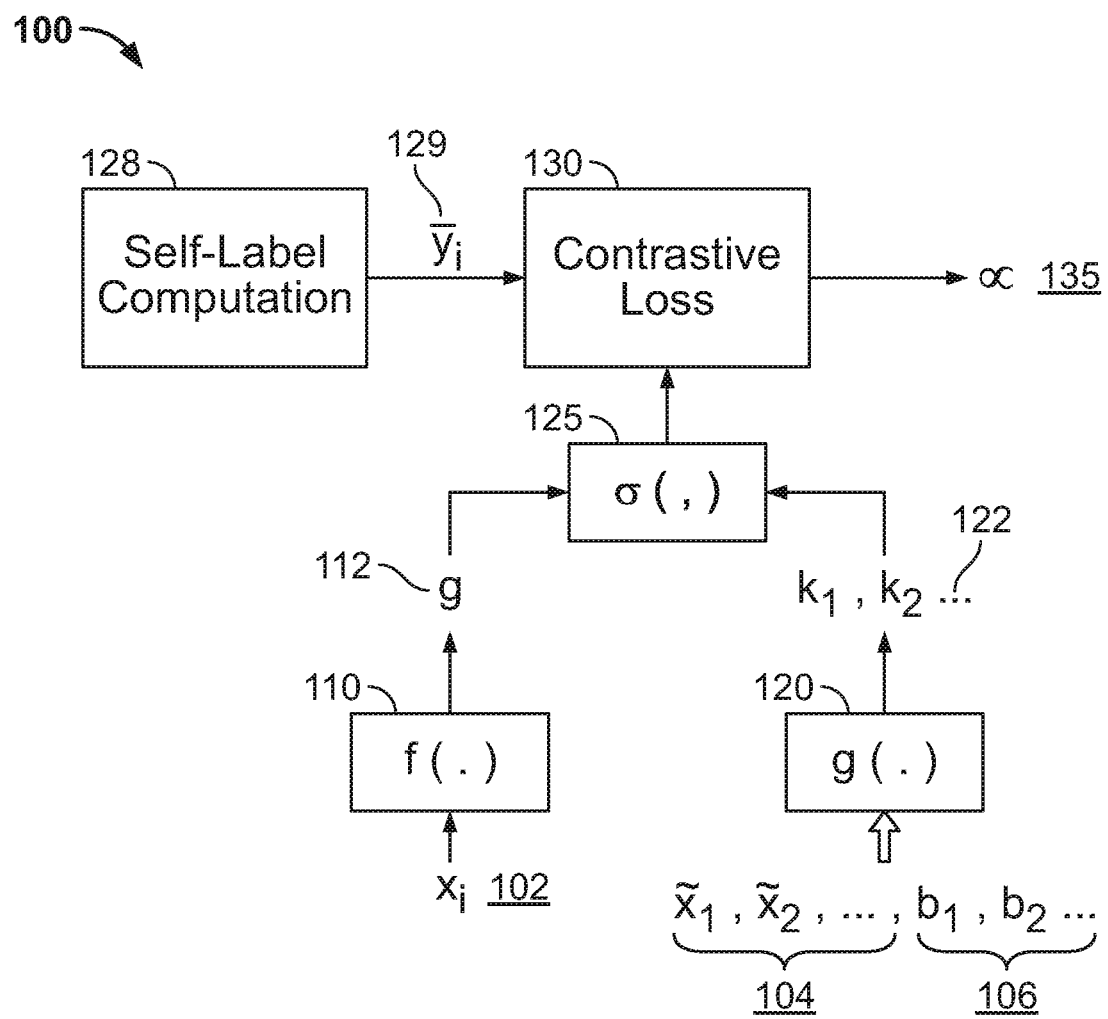
FIG. 1 is a simplified block diagram illustrating a contrastive learning system 100 with self-labeling refinery, according to embodiments described herein.

In the figures and appendix, elements having the same designations have the same or similar functions.

DETAILED DESCRIPTION

Contrastive learning is a self-supervised learning method, which usually learn through an augmented positive instance of a training instance, paired with a negative instance to the training instance that are both input to the neural network. During training, the representations of different augmentations or crops of the same instance are pulled close to each other, while representations of different instances are pushed away from each other. Thus, without any pre-annotated training instances, contrastive learning methods often generate "artificially" labeled data by assuming augmentations of the same instance are positives and augmentations of other instances are negative. Such label assignments can be noisy and impairs the generalization performance, because sometimes negative instances can be semantically similar to the original instance, or even share the same semantic class as the original instance.

For example, a query could be semantically similar or even more similar to some negatives than its positives. Indeed, some negatives may even belong to the same semantic class as the query. This is because, to achieve satisfactory performance, one often uses sufficient negatives that are much more than the semantic class number, which unavoidably leads to the issue on negatives. In addition, even for the same image, especially for images with several different objects which occurs in ImageNet, random augmentations, e.g. crop, can provide crops with (slightly) different semantic information, and thus some of the huge negatives could be (more) similar to query. Hence, the one-hot label does not well reveal the semantically similarity between the query and its positives and "negatives", and thus cannot guarantee the semantically similar samples to close each other, leading to performance degradation of contrastive learning.

In view of the need to improve the accuracy of contrastive learning, embodiments described herein provide a contrastive learning mechanism with self-labeling refinement, which iteratively employs the network and data themselves to generate more accurate and informative soft labels for contrastive learning. Specifically, the contrastive learning framework includes a self-labeling refinery module to explicitly generate accurate labels, and a momentum mix-up module to increase similarity between a query and its positive, which in turn implicitly improves label accuracy.

For example, given a query, the self-labeling refinery module adopts a positive instance of the query to estimate semantic similarity between the query and its keys (i.e. its positive and negatives) by computing their feature similarity. This is because a query and its positive come from the same image and should have similar semantic similarity on the same keys. Then the self-labeling refinery module linearly combines the estimated similarity of a query with its vanilla one-hot label in contrastive learning to iteratively generate more accurate and informative soft labels. Thus, in this way, at early training stage, one-hot labels have greater combination weights to provide relatively accurate labels. As the training process progresses, the estimated similarity becomes more accurate and informative, and thus the combination weight for the similarity becomes larger. This is because the similarity captures useful underlying semantic information between the query and its keys, which can sometimes be missing from the one-hot labels. This strategy is both empirically and theoretically effective.

In this way, even when the semantic labels in the instance discrimination task for contrastive learning are corrupted, the generated self-labeling may recover the true semantic labels of training data. Thus, networks trained with self-labeling may more accurately predict the true semantic labels of test samples.

In one embodiment, the momentum mix-up module for contrastive learning to further reduces the possible label noise and also increases augmentation diversity. For example, a dataset of queries $\{x_i\}_{i=1}^n$ and their corresponding positives $\{\tilde{x}_i\}_{i=1}^n$ may be randomly combined using a random variable as the combination weight: $x_i'=\theta x_i+(1-\theta)\tilde{x}_k$. The estimated label corresponding to an input of $x_i'$ is $y_i'=f\overline{y}_i+(1\theta)\overline{y}_k$, where index i and k are randomly selected, $\overline{y}_i$ is the label of both $x_i$ and $\tilde{x}_i$ estimated by the label refinery module, and $\theta \in (0,1)$ is a random variable. In this way, the component $\tilde{x}_k$ in the virtual query $x_i'$ directly increases the similarity between the query $x_i'$ and the positive key $\tilde{x}_k$. Therefore, the label weight $(1-\theta)$ of label $y_i'$ on positive key $\tilde{x}_i$ to bring $x_i'$ and $\tilde{x}_k$ together is relatively accurate, since $x_i'$ contains the sematic information of $\tilde{x}_k$. Meanwhile, the possible noise at the remaining positions of label $y_i'$ is scaled by $\theta$ and becomes smaller. This is precisely why the positive $\tilde{x}_k$ is selected to play a contrastive key for instance discrimination instead of the original query $x_k$ for mixup. The momentum mix-up module feeds $\tilde{x}_k$ into momentum-updated network to construct a positive key.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

FIG. 1 is a simplified block diagram illustrating a contrastive learning system 100 with self-labeling refinery, according to embodiments described herein. The contrastive learning system 100 includes an online network f( ) 110 and a target network g( ) 120, each of which includes a feature encoder and a projection head (e.g., a 3-layered multi-layer perceptron).

Given a batch of training images $\{c_i\}_{i=1}^s$ at each iteration, each original image sample $c_i$ is randomly augmented into two views $(x_i, \tilde{x}_i)$ with $x_i$ being referred to as a query sample and $\tilde{x}_i$ being referred to as the positive instance of the query sample. A set $B=\{b_i\}_{i=1}^b$ denotes the negative keys of current query samples $\{x_i\}_{i=1}^s$. For example, a large dictionary size b is often used to achieve satisfactory performance, e.g. 65,536. In one implementation, B may be updated by the minibatch features $\{g(\tilde{x}_i)\}_{i=1}^s$ in the first-in and first-out order.

In one embodiment, the query sample $x_i$ 102 may be input to the online network f( ) 110, while the set of positive instances $\{\tilde{x}_i\}_{i=1}^s$ 104 and the set of negative instance $B=\{b_i\}_{i=1}^b$ 106 may be input to the target network g( ) 120.

The online network f( ) 110 may in turn generate an encoded query representation $q=f(x_i)$ 112, while the target network g( ) 120 may generate a set of encoded key representations $\{g(\tilde{x}_i)\}_{i=1}^s \cup \{g(b_i)\}b_{i=1}^b$ 122. A similarity metric between the encoded query representation 112 and the set of encoded key representations 122 is then computed at similarity module $\sigma(,)$ 125, which computes a similarity of two representations in the feature space, e.g., $$\sigma(x, y) = \exp\left(-\frac{\langle f(x), g(y) \rangle}{\tau \|f(x)\|_2 \cdot \|g(y)\|_2}\right)$$

with a temperature parameter $\tau$.

For example, the similarity module 125 may compute a similarity metric $\sigma(x_i, \overline{b}_k)$ where $\overline{b}_k$ denotes the k-th sample in $\overline{B}=\{\tilde{x}_i\}_{i=1}^s \cup \{b_i\}_{i=1}^b$.

The similarity metrics computed from module 125 may be sent to the contrastive loss module 130. Specifically, the contrastive loss module 130 computes a loss 135 based on the self-labels 129 from a self-label computation 128 and the similarity metrics:

$$\mathcal{L}_c(w, \{(x_i, \overline{y}_i)\}) = -\frac{1}{s}\sum_{i=1}^s\sum_{k=1}^{s+b}\overline{y}_{ik}\log\left(\frac{\sigma(x_i, \overline{b}_k)}{\sum_{l=1}^{s+b}\sigma(x_i, \overline{b}_l)}\right),$$

where w denotes the parameters of the online network f( ), $\overline{b}_k$ denotes the k-th sample in $\overline{B}$, and $\overline{y}_i$ is the self-label of query $x_i$ whose i-th entry $\overline{y}_{ii}$ is one. Due to the shared instance set $\overline{B}$, all queries have unified label definition and their labels can be linearly combined to form the self-label, as further described in FIG. 2.

The online network f( ) 110 is then updated by the computed loss 135, e.g., via backpropagation, by fixing the parameters of the target network g( ) 120. The target network g ( ) 120 is then updated via exponential moving average (EMA), e.g., $\xi=(1+\iota)\xi+\iota\omega$ where $\xi$ denotes the parameters of g( ) and $\iota \in (0,1)$ is a constant.

Figure 2:
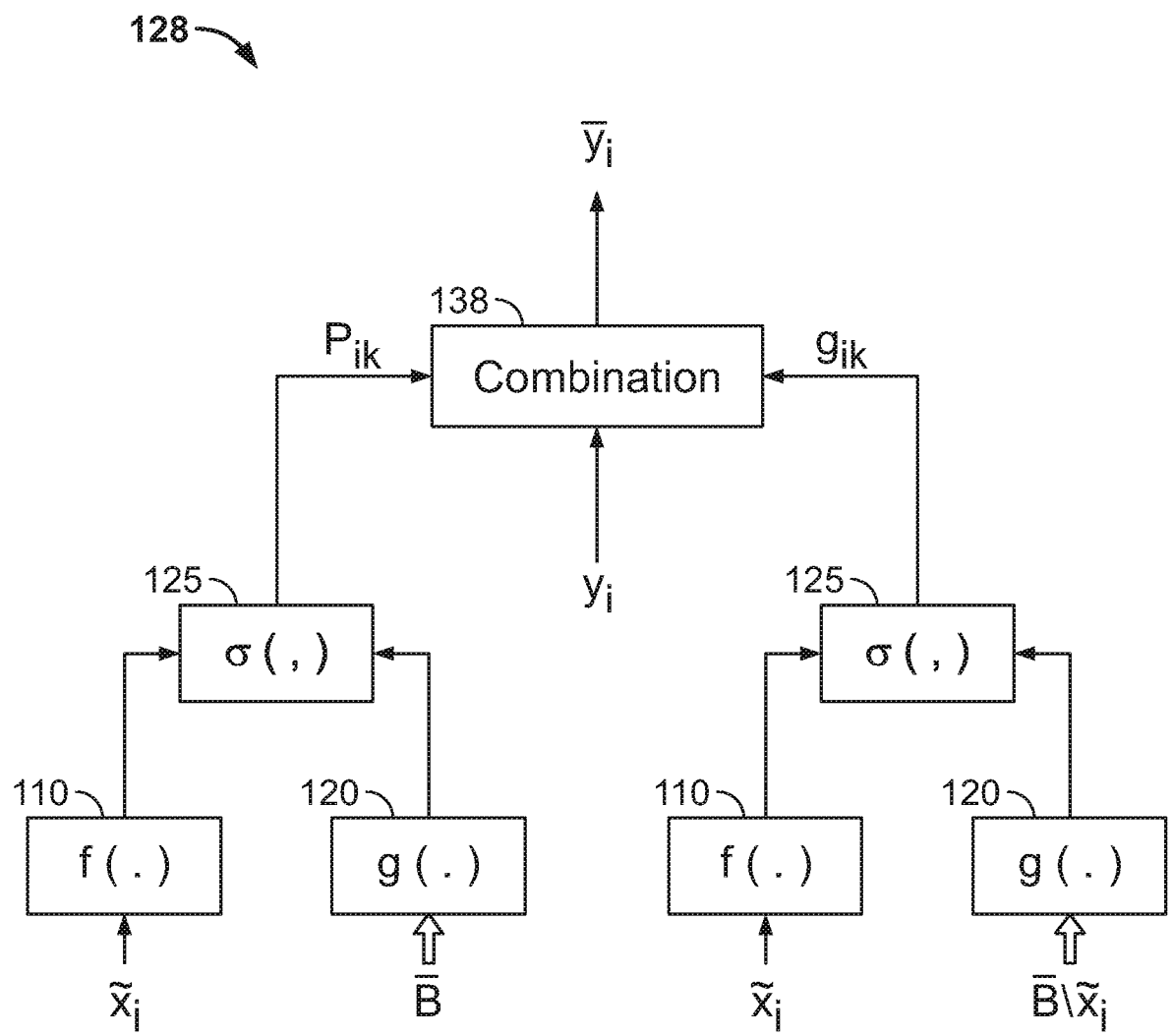
FIG. 2 is a simplified block diagram illustrating the self-label computation module shown in FIG. 1, according to embodiments described herein.

FIG. 2 is a simplified block diagram illustrating the self-label computation module 128 shown in FIG. 1, according to embodiments described herein. Traditionally, one-hot labels of query samples have been used in computing the contrastive loss 135, which does not always well reveal the semantic similarity between $x_i$ and the instance keys in the set $\overline{B}$, and thus impairs good representation learning.

In view of this issue, a self-labeling refinery module 128 employs network and data themselves to improve the quality of inaccurate labels during training, which generates more accurate and informative labels, and improves the performance of contrastive learning. Specifically, to refine the one-hot label $y_i$ of query $x_i$, the positive instance $\tilde{x}_i$ is input to the online network f( ) 110 and instance in the set $\overline{B}=\{\tilde{x}_i\}_{i=1}^s \cup \{b_i\}_{i=1}^b$ are input to the target network g( ) 120, the outputs of which are used by the similarity module 125 to estimate the possible underlying semantic similarity between $x_i$ and instances in $\overline{B}=\{\tilde{x}_i\}_{i=1}^s \cup \{b_i\}_{i=1}^b$. $x_i$ and $\tilde{x}_i$ come from the same image and should have similar semantic similarity with instances in $\overline{B}$.

To this end, at the t-th iteration, the instance-class probability $p_i^t \in \mathbb{R}^{s+b}$ of $x_i$ on the set $\overline{B}$ whose k-th entry is defined as $$p_{ik}^t = \sigma^{1/\tau'}(\tilde{x}_i, \overline{b}_k)/\sum_{l=1}^{s+b}\sigma^{1/\tau'}(\tilde{x}_i, \overline{b}_l),$$

where $\bar{b}_k$ is the k-th sample in $\bar{B}$. The constant $\tau' \in (0,1]$ sharpens $p_i^t$, and removes some possible small noise. As $p_{ik}^t$ measures the semantic similarity between $x_i$ and $\bar{b}_k$, it can serve as an instance-class probability to measure whether $x_i$ and $\bar{b}_k$ share the same semantic class.

On the other hand, as $\tilde{x}_i$ is highly similar to itself, $p_{ii}^t$ could be much larger than others and conceals the similarity of other semantically similar instances in $\bar{B}$. To alleviate this artificial effect, $\tilde{x}_i$ is then removed from the set $\bar{B}$. For example, instance in $\bar{B} \backslash \tilde{x}_i$ are input to the target network g( ) 120, and $\tilde{x}_i$ is input to the online network f( ) 110 to estimate the similarity between $\tilde{x}_i$ and the remaining instances in $\bar{B}$ by the similarity metric 125. The estimated similarity metrics are then used to compute the instance class probability:

$$q_{ik}^t = \sigma^{1/\tau'}(\tilde{x}_i, \bar{b}_k) / \sum_{l=1, l \neq i}^{s+b} \sigma^{1/\tau'}(\tilde{x}_i, \bar{b}_l), q_{ii}^t = 0$$

Then, the combination module 138 combines the one-hot label $y_i$ and two label estimations, i.e. $p_i$ and $q_i$, to obtain the more accurate, robust and informative label $\bar{y}_i^t$ of $x_i$ at the t-th iteration:

$$\bar{y}_i^t = (1 - \alpha_t - \beta_t) y_i + \alpha_t p_i^t + \beta_t q_i^t,$$

where $\alpha_t$ and $\beta_t$ are two constants. In one implementation, $\alpha_t = \mu \max_k p_{ik}^t / z$ and $\beta_t = \mu \max_k q_{ik}^t / z$, where $z = 1 + \mu \max_k p_{ik}^t + \mu \max_k q_{ik}^t$, the constants 1, $\max_k p_{ik}^t$ and $\max_k q_{ik}^t$ respectively denote the largest confidences of labels $y_i$, $p_i^t$ and $q_i^t$ on a certain class. Here hyperparameter $\mu$ controls the prior confidence of $p^t$ and $q^t$. So the self-label refinery only has two parameters $\tau'$ and $\mu$ to tune.

FIG. 3 is a simplified logic flow diagram illustrating an aspect of contrastive learning with self-labeling refinement as described in FIGS. 1-2, according to some embodiments. One or more of the processes 302-318 of method 300 may be implemented, at least in part, in the form of executable code stored on non-transitory, tangible, machine-readable media that when run by one or more processors may cause the one or more processors to perform one or more of the processes 302-318. In some embodiments, method 300 may correspond to the method used by the module 530 described in relation to FIG. 5.

At step 302, a training batch of unlabeled queries is received, e.g., a mini-batch of queries $\{x_i\}_{i=1}^s$.

At step 304, for each unlabeled query, a positive instance $\tilde{x}_i$ paired with the query sample is generated.

At step 306, a first instance probability distribution is computed based on a first semantic similarity between the first positive instance and a set of positive instances and negative instances generated from the training batch of query samples. For example, at the t-th iteration, the instance-class probability $p_i^t \in \mathbb{R}^{s+b}$ of $x_i$ on the set $\bar{B} = \{\tilde{x}_i\}_{i=1}^s \cup \{b_i\}_{i=1}^b$ is computed.

At step 308, the first positive instance corresponding to the first unlabeled query sample is removed from the set of positive instances and negative instances.

At step 310, a second instance probability distribution is computed based on a second semantic similarity between the first positive instance and remaining instances in the set of positive instances and negative instances. For example, $\tilde{x}_i$ is removed from the set $\bar{B}$ to estimate the similarity between $x_i$ and the remaining instances in $\bar{B}$.

At step 312, a first self-label is generated by combining a one-hot label of the first unlabeled query, the first label estimation and the second label estimation. For example, the one-hot label $y_i$ and two label estimations, i.e. pi and qi, are linearly combined to obtain more accurate, robust and informative label $\bar{y}_i^t$ of $x_i$ at the t-th iteration.

At step 314, an encoded output based on a contrastive input of the set of positive instances and negative instances is generated by a machine learning model, e.g., networks f( ) and g( ).

At step 316, a contrastive loss objective may be computed based at least in part on the generated self-label, e.g., as described in relation to module 130 in FIG. 1.

At step 318, the machine learning model is updated based on the contrastive loss objective via backpropagation. For example, the online network f( ) 110 is updated by the computed loss 135, e.g., via backpropagation, by fixing the parameters of the target network g( ) 120. The target network g( ) 120 is then updated via exponential moving average (EMA), e.g., $\xi = (1-\iota)\xi + \iota\omega$ where $\xi$ denotes the parameters of g( ) and $\iota \in (0,1)$ is a constant.

Figure 4:
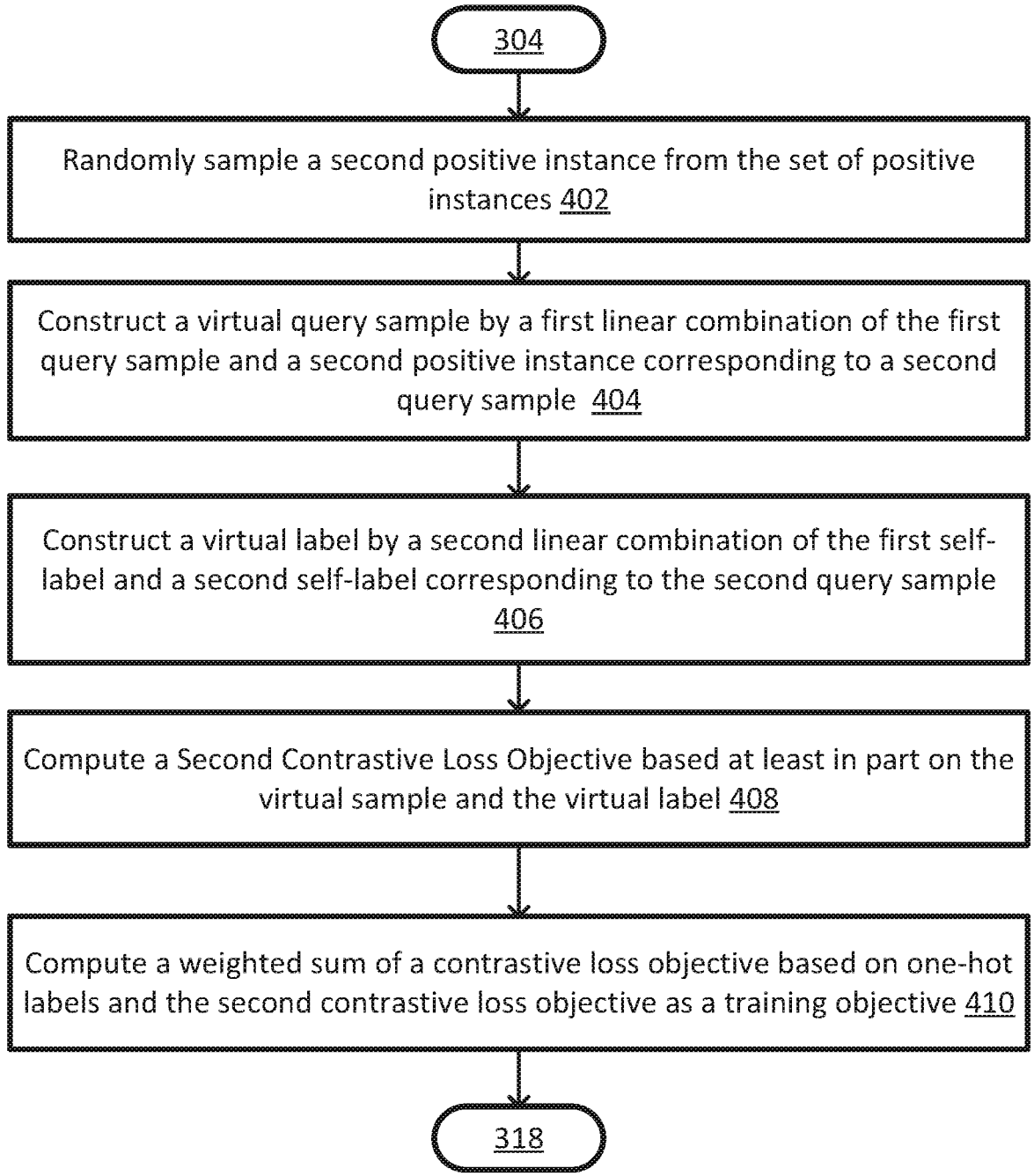
FIG. 4 is a simplified logic flow diagram illustrating an aspect of using momentum mix-up to refine the contrastive learning described in FIGS. 1-3, according to some embodiments.

FIG. 4 is a simplified logic flow diagram illustrating an aspect of using momentum mix-up to refine the contrastive learning described in FIGS. 1-3, according to some embodiments. One or more of the processes 402-410 of method 400 may be implemented, at least in part, in the form of executable code stored on non-transitory, tangible, machine-readable media that when run by one or more processors may cause the one or more processors to perform one or more of the processes 402-410. In some embodiments, method 400 may correspond to the method used by the module 530 described in relation to FIG. 5.

Method 400 uses momentum mix-up to further reduce the possible label noise in realistic data and increase the diversity of data as well. Continuing on from step 304 in FIG. 3, at step 402, a second positive instance (which may be different from the first positive instance described in FIG. 3) is randomly sampled from the set of positive instances. At step 404, a virtual query sample is constructed by a linear combination of the first query sample and a second positive instance corresponding to the second query sample. At step 406, a virtual label is constructed by a linear combination of the first self-label and the second self-label corresponding to the second query sample. For example, the virtual query sample $x_i'$ and the virtual label $y_i'$ are computed by:

$$x_i' = \theta x_i + (1-\theta) \tilde{x}_k, y_i' = \theta y_i + (1-\theta) \bar{y}_k,$$

where $\tilde{x}_k$ is randomly sampled from the key set $\{\tilde{x}_i\}_{i=1}^s$, $\bar{y}_i$ denotes the self-label generated by module 128, $\theta \in [0,1]$ obeys the beta distribution Beta($\kappa,\kappa$). Here $x_i$ and $\tilde{x}_i$ share the same label $\bar{y}_i$ on the set $\bar{B} = \{\tilde{x}_i\}_{i=1}^s \cup \{b_i\}_{i=1}^b$, since they come from the same instance. The virtual label is referred to as "momentum mix-up", as the sample $\tilde{x}_k$ is fed into the momentum-updated network $g_\xi$, and plays a contrastive key for instance discrimination.

At step 408, a second contrastive loss objective may be computed by using the virtual sample and the virtual label, e.g., to replace $x_i$ and the self-label $\bar{y}_i$ at loss module 130 in FIG. 1.

Thus, in this way, momentum mix up can further improve the accuracy of the label $y_i'$ compared with the traditionally used one hot labels. The virtual sample $x_i'$ has two positive keys $x_i$ and $\tilde{x}_k$. Accordingly, the component $\tilde{x}_k$ in $x_i' = \theta x_i + (1-\theta)\tilde{x}_k$ directly increases the similarity between the query $x_i'$ and its positive key $\tilde{x}_k$ in $\bar{B}$. So the label weight $(1-\theta)$ of label $y_i'$ on the key $\tilde{x}_k$ to bring $x_i'$ and $\tilde{x}_k$ together is relatively accurate, as $x_i'$ really contains the semantic information of $\tilde{x}_k$. Meanwhile, the sum of label weights in $y_i'$ on remaining instance in $\bar{B}\backslash\tilde{x}_k$ is scaled by $\theta$, which also scales the possible label noise on instances in $\bar{B}\backslash\tilde{x}_k$ smaller due to $\theta<1$.

Another advantage of momentum mix-up is strong augmentation. It is observed that directly using strong augmentation in contrastive learning may lead to performance degradation, as the instance obtained by strong augmentation often heavily differs from the one with weak augmentation. As aforementioned, the component $\tilde{x}_k$ in $x_i'=\theta x_i+(1-\theta)\tilde{x}_k$ increases the similarity between the query instance $x_i'$ and the key instance $\tilde{x}_k$ in $\bar{B}$, even though $(x_i, \tilde{x}_i)$ is obtained via strong augmentation. So the momentum mix-up could reduce the matching difficulty of positive instances, and promotes the learning of online network.

At step 410, a weighted sum of a contrastive loss objective computed based on one-hot labels and the second contrastive loss objective may be optionally computed as a training objective. For example, the combined training objective may be defined as:

$$\mathcal{L}_{(w)}=(1-\lambda)\mathcal{L}_c(w,\{(x_i,y_i)\})+\lambda\mathcal{L}_c(w,\{(x_i',y_i')\}),$$

where $\mathcal{L}_c(w,\{(x_i,y_i)\})$ denotes the vanilla contrastive loss with one-hot label $y_i$, $\mathcal{L}_c(w,\{(x_i',y_i')\})$ denotes the momentum mix up loss with label $y_i'$ estimated by our self-labeling refinery, and $\lambda$ is a constant. Method 400 may then proceed to step 318 in FIG. 3 to update the machine learning model.

Figure 5:
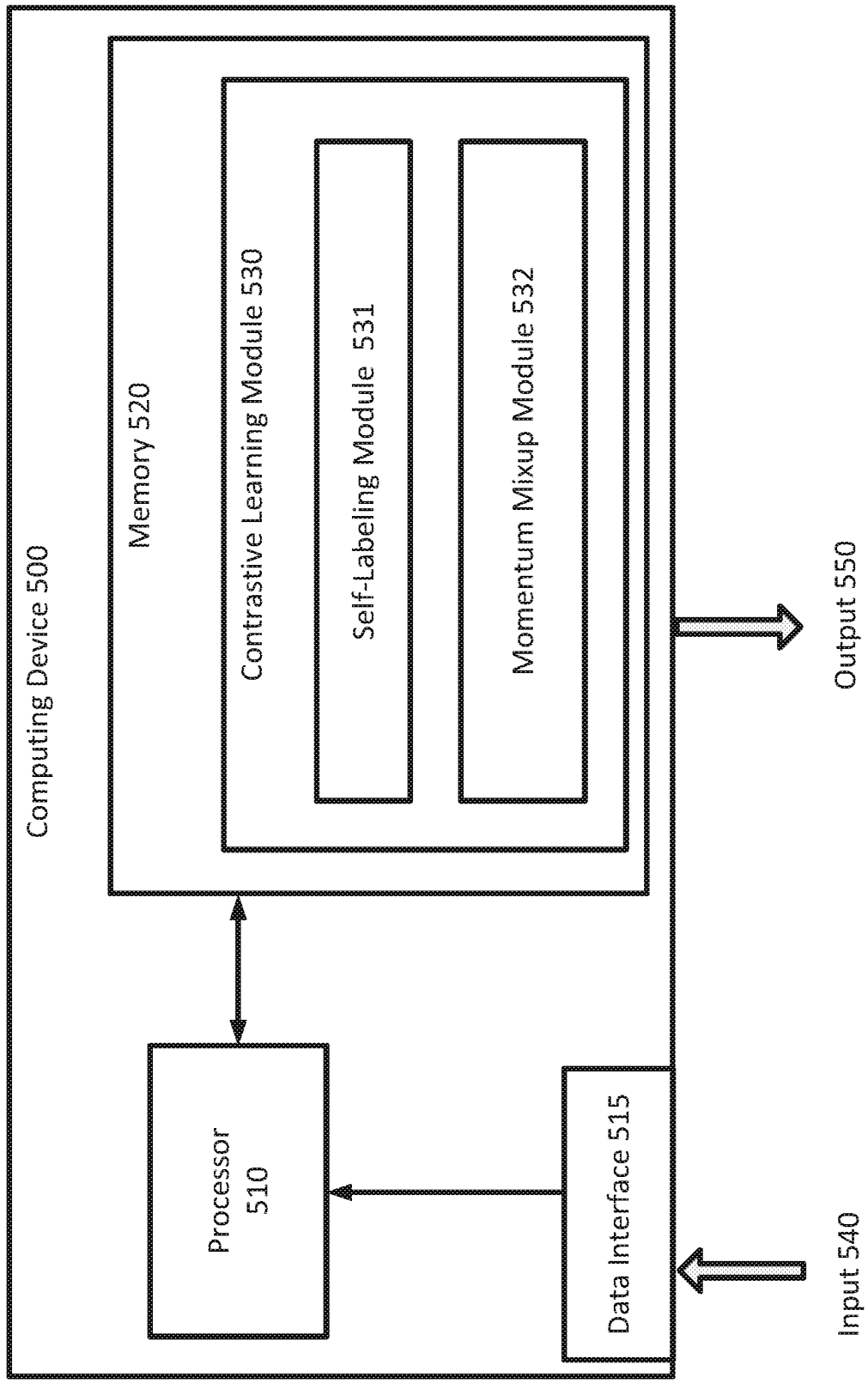
FIG. 5 is a simplified diagram of a computing device for implementing the proposed contrastive learning with self-labeling refinement, according to some embodiments.

FIG. 5 is a simplified diagram of a computing device for implementing the proposed contrastive learning with self-labeling refinement, according to some embodiments. As shown in FIG. 5, computing device 500 includes a processor 510 coupled to memory 520. Operation of computing device 500 is controlled by processor 510. And although computing device 500 is shown with only one processor 510, it is understood that processor 510 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 500. Computing device 500 may be implemented as a stand-alone subsystem, as a board added to a computing device, and/or as a virtual machine.

Memory 520 may be used to store software executed by computing device 500 and/or one or more data structures used during operation of computing device 500. Memory 520 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 510 and/or memory 520 may be arranged in any suitable physical arrangement. In some embodiments, processor 510 and/or memory 520 may be implemented on a same board, in a same package (e.g., system-in-package), on a same chip (e.g., system-on-chip), and/or the like. In some embodiments, processor 510 and/or memory 520 may include distributed, virtualized, and/or containerized computing resources. Consistent with such embodiments, processor 510 and/or memory 520 may be located in one or more data centers and/or cloud computing facilities.

In some examples, memory 520 may include non-transitory, tangible, machine readable media that includes executable code that when run by one or more processors (e.g., processor 510) may cause the one or more processors to perform the methods described in further detail herein. For example, as shown, memory 520 includes instructions for a contrastive learning module 530 that may be used to implement and/or emulate the systems and models, and/or to implement any of the methods described further herein. In some examples, the contrastive learning module 530, may receive an input 540, e.g., such as unlabeled image instances, via a data interface 515. The data interface 515 may be any of a user interface that receives a user uploaded image instance, or a communication interface that may receive or retrieve a previously stored image instance from the database. The contrastive learning module 530 may generate an output 550, such as classification result of the input 540.

In some embodiments, the contrastive learning module 530 may further includes the self-labeling module 531 and a momentum mix-up module 532. Further functionality of the self-labeling module 531 may be discussed in relation to FIGS. 2 and 3, and further functionality of the momentum mix-up module 532 may be discussed in relation to FIG. 4. In some examples, the contrastive learning module 530 and the sub-modules 531-333 may be implemented using hardware, software, and/or a combination of hardware and software.

Example Performance

The dataset ResNet50 with a 3 layered MLP head for CIFAR10 and ImageNet are used. The contrastive learning with self-labeling refinement model, referred to as CLEAN, is first pretrained and then train a linear classifier on top of 2048-dimensional frozen features provided by ResNet50. With dictionary size 4,096, it is pretrained for 2,000 epochs on CIFAR10. Dictionary size on ImageNet is 65,536. For linear classifier, it is trained for 200 and 100 epochs on CIFAR10 and ImageNet, respectively.

Standard data augmentations are used as described in He et al., Momentum contrast for unsupervised visual representation learning. In Proc. IEEE Conf. Computer Vision and Pattern Recognition, pp. 9729-9738, 2020, for pretraining and test unless otherwise stated. For example, for test, normalization is performed on CIFAR10, and employ center crop and normalization on ImageNet. For CLEAN, we set $\tau=0.2$, $\tau'=0.8$, $\kappa=2$ in Beta($\kappa,\kappa$) on CIFAR10, and $\tau=0.2$, $\tau'=1$, $\kappa=0.1$ on ImageNet. For confidence $\mu$, it is increased as $\mu_t=m_2-(m_2-m_1)(\cos(\pi t/T)+1)/2$ with current iteration t and total training iteration T. Set $m_1=0$, $m_2=1$ on CIFAR 10, and $m_1=0.5$, $m_2=10$ on ImageNet. For KNN on CIFAR10, its neighborhood number is 50 and its temperature is 0.05.

For CIFAR 10, to fairly compare with Lee et al., Mixco: Mix-up contrastive learning for visual representation. arXiv preprint arXiv:2010.06300, 2020, each image is cropped into two views to construct the loss. For ImageNet, CLSA (described in Wang & Qi, Contrastive learning with stronger augmentations, 2021) and train CLEAN in two settings. CLEAN-Single uses a single crop in momentum mixup loss $\mathcal{L}_c(w,\{(x_i',y_i')\})$ that crops each image to a smaller size of 96×96, without much extra computational cost to process these small images. CLEAN multi-crops each image into five sizes 224×224, 192×192, 160×160, 128×128, and 96×96 and averages their momentum mixup losses. This ensures a fair comparison with CLSA and SwAV. Moreover, we use strong augmentation strategy in CLSA.

Specifically, for the above small image, an operation is randomly selected from 14 augmentations used in CLSA, and apply it to the image with a probability of 0.5, which is repeated 5 times. "(strong)" is used to mark whether we use strong augmentations on the small images in momentum mix-up loss. Thus, CLEAN has almost the same training cost with CLSA. For vanilla contrastive loss on ImageNet, weak augmentations are always used.

From Table 1 in FIG. 6, one can observe that with weak or strong augmentations, CLEAN always surpasses the baselines on CIFAR10. Moreover, CLEAN with strong (weak) augmentation improves supervised baseline by 1%(0.6%).

Table 2 in FIG. 7 also shows that for ImageNet under weak augmentation setting, for 200(800) epochs CLEAN-Multi respectively brings 0.8% (0.6%) improvements over SwAV; with 200 (800) epochs, CLEAN-Single also beats the runner-up MixCo (i-Mix and SimSiam). Note, BYOL outperforms CLEAN-Single but was trained 1,000 epochs. With strong augmentation, CLEAN-Single and CLEAN-Multi also respectively outperform CLSA-Single and CLSA-Multi. Moreover, our self-supervised accuracy 76.4% is very close to the accuracy 76.5% of supervised baseline. These results show the superiority and robustness of CLEAN, thanks to the complementary self-labeling refinery and momentum mixup in CLEAN which both improve label quality and thus bring semantically similar samples together.

The pretrained CLEAN model is also pretrained on VOC (described in Everingham et al., The pascal visual object classes (voc) challenge, Int'l. J. Computer Vision, 88(2): 303-338, 2010) and COCO (Lin et al., Microsoft coco: Common objects in context. In Proc. European Conf. Computer Vision, pp. 740-755. Springer, 2014). For classification, a linear classifier is trained upon ResNet50 100 epochs by SGD. For object detection, the same protocol is used in He et al., Momentum contrast for unsupervised visual representation learning. In Proc. IEEE Conf. Computer Vision and Pattern Recognition, pp. 9729-9738, 2020, to fine-tune the pretrained ResNet50 based on detectron2 (described in Wu et al., detectron 2, 2019) for fairness. On VOC, detection head is trained with VOC07+12 train val data and tested on VOC07 test data. On COCO, the head is trained on train2017 set and evaluate on the val2017.

Table 3 in FIG. 8 reports the results on VOC and COCO. CLEAN consistently outperforms the compared state-of-the-art approaches on both classification and object detection tasks. Moreover, it enjoys better performance than supervised method pretrained on ImageNet. These results show the superior transferability and generalization of CLEAN.

CLEAN is trained for 1,000 epochs on CIFAR10 to investigate the effects of each component in CLEAN using strong augmentation. Table 4 in FIG. 9 shows the individual benefits of each component, including the label estimations p and q in the self-labeling refinery, and the momentum mixup. Table 5 in FIG. 9 shows the stable performance of CLEAN on CIAFR 10 when tuning regularization parameter $\lambda$ in the combined contrastive loss in a relatively large range, thus testifying the robustness of CLEAN.

Then the momentum mix-up is compared with vanilla mix-up in the concurrent works (described in Kim et al., Mixco: Mix-up contrastive learning for visual representation. arXiv preprint, arXiv:2010.06300, 2020; and Lee et al., Hi-mix: A strategy for regularizing contrastive representation learning. arXiv preprint arXiv:2010.08887, 2020). Specifically, one-hot label is used in MoCo and replace $\tilde{x}_j$ in with the query $x_j$ to obtain "MoCo+mix-up", and CLEAN with one-hot label can be viewed as "MoCo+momentum mixup". Then these methods are trained for 1,000 epochs on CIFAR 10 with weak/strong augmentation, and 200 epochs on ImageNet with weak augmentations. Table 6 in FIG. 10 shows that with weak augmentation, momentum mix-up always outperforms vanilla mix-up in (Kim et al., 2020; Lee et al., 2020). Moreover, momentum mix-up using strong augmentation has accuracy 94.8% and improves its weak augmentation version, while vanilla mix-up with strong augmentation suffers from performance degradation. It is because that momentum mix-up can well reduce the possible label noise, especially for strong augmentations, and thus can enhance the performance more.

Additional Performance Analysis

Performance of the self-labeling refinery on label-corrupted data is analyzed as follows. Let $\{c_i\}_{i=1}^{K} \subset \mathbb{R}^d$ be K vanilla samples belonging to $\overline{K} \leq K$ semantic classes, and $\{(x_i, y_i)\}_{i=1}^{n} \in \mathbb{R}^d \times \mathbb{R}$ be the random crops of $\{c_i\}_{i=1}^{K}$. Since in practice, one often cares more the semantic class prediction performance of a model which often directly reflects the performance on the downstream tasks, it is assumed that the labels $\{y_i\}_{i=1}^{n}$ denote corrupted semantic-class labels. Accordingly, it is analyzed whether self-labeling refinery can refine the corrupted labels $\{y_i\}_{i=1}^{n}$ and whether it helps a model learn the essential semantic-class knowledge of $\{x_i\}_{i=1}^{n}$. Finally, while allowing for multiple classes, it is assumed the labels are scalars and take values in $[-1,1]$ interval for simplicity. The label-corrupted dataset is defined below.

Definition 1(($\rho, \varepsilon, \delta$)-corrupted dataset). Let $\{(x_i, y_i^*)\}_{i=1}^{n}$ denote the pairs of crops (augmentations) and ground-truth semantic label, where crop $x_i$ generated from the t-th sample $c_t$ obeys $\|x_i - c_t\|_2 \leq \varepsilon$ with a constant $\varepsilon$, and $y_i^* \in \{\gamma_t\}_{t=1}^{\overline{K}}$ of $x_i$ is the label of $c_t$. Moreover, samples and the crops are normalized, i.e. $\|c_i\|_2 = \|x_k\|_2 = 1 (\forall i, k)$. Each $c_i$ has $n_i$ crops, where $$c_l \frac{n}{K} \leq n_i \leq c_u \frac{n}{K}$$

with two constants $c_l$ and $c_u$. Moreover, the classes are separated:

$$|\gamma_i - \gamma_k| \geq \delta, \|c_i - c_k\|_2 > 2\varepsilon, (\forall i \neq k),$$

where $\delta$ is the label separation. A ($\rho, \varepsilon, \delta$)-corrupted dataset $\{(x_i, y_i)\}_{i=1}^{n}$ obeys the above conditions but with corrupted label $\{y_i\}_{i=1}^{n}$. Specifically, for each sample $c_i$, at most $\rho n_i$ augmentations are assigned to wrong labels in $\{\gamma_i\}_{i=1}^{\overline{K}}$.

Then a network of one hidden layer is studied as an example to investigate the label refining performance of the method:

$$x \in \mathbb{R}^d \mapsto f(W, x) = v^T \phi(Wx)$$

where $W \in \mathbb{R}^{k \times d}$ and $v \in \mathbb{R}^k$ are network parameters, and $\phi$ is an activation function. v is fixed to be a unit vector where half the entries are $1/\sqrt{k}$ and other half are $-1/\sqrt{k}$ to simplify exposition. So it is only optimized over W that contains most network parameters and will be shown to be sufficient for label refinery. Then given a ($\rho, \varepsilon, \delta$)-corrupted dataset $\{(x_i, y_i)\}_{i=1}^{n}$, at the t-iteration we train the network via minimizing the quadratic loss:

$$\mathcal{L}_t(W) = \frac{1}{2} \sum_{i=1}^{n} (\overline{y}_i^t - f(W, x_i))^2 = \frac{1}{2} \|\overline{y}^t - f(W, X)\|_2^2.$$

Here the label $\overline{y}_i^t$ of sample $x_i$ is estimated at module 128 as described in FIG. 2, where $p_i^t = f(W_t, \tilde{x}_i)$ denotes predicted label by using the positive $\tilde{x}_i$ of $x_i$, i.e. $\|\tilde{x}_i - c_l\|_2 \leq \varepsilon$ if $x_i$ is augmented from vanilla sample $c_l$. If setting $\beta_t = 0$ and $\tau^t = 1$ for simplicity, as (i) performing nonlinear mapping on network output greatly increases analysis difficulty; (ii) the self-label refinery is still provably sufficient to refine labels when $\beta_t=0$ and $\tau'=1$. Then W may be updated via gradient descent algorithm:

$$W_{t+1} = W_t - \eta \nabla \mathcal{L}_t(W_t), \quad (5)$$

where $\eta$ is a learning rate. According to network convergence analysis, gradient descent and quadratic loss may be used, since (i) gradient descent is expectation version of stochastic one and often reveals similar convergence behaviors; (ii) one can expect similar results for other losses, e.g. cross entropy, but quadratic loss gives simpler gradient computation. For analysis, mild assumptions are imposed on the network and the self-labeling refinery, which are widely used in network analysis.

Assumption 1. For the network (6), suppose the activation $\phi$ and its first- and second-order derivatives obey $|\phi(0)|$, $|\phi'(z)|$, $|\phi''(z)| \leq \Gamma$ for $\forall z$ and some $\Gamma \geq 1$. Moreover, the entries of initialization $W_0$ obey i.i.d. $\mathcal{N}(0,1)$.

Assumption 2. Define network covariance matrix $\Sigma(C) = (CC^T) \odot \mathbb{E}_u[\phi'(Cu)\phi'(Cu)^T]$ where $C = [c_1 \ldots c_K]^T$, $u \sim \mathcal{N}(0, I)$, $\odot$ is the elementwise product. Let $\lambda(C) > 0$ be the minimum eigenvalue of $\Sigma(C)$. For label refinery, assume $$3\sqrt{n} \sum_{t=0}^{t_0-1} |\alpha_t - \alpha_{t+1}| \leq \psi_1 \|f(W_0, X) - y^*\|_2 \text{ and}$$

$$3\sqrt{n} \sum_{t=0}^{t_0-1} \left(1 - \frac{\eta\alpha^2}{4}\right)^{t_0-t} |\alpha_t - \alpha_{t+1}| \leq \psi_2 \|f(W_0, X) - y^*\|_2^2 \text{ where}$$

$$t_0 = \frac{c_1 K}{\eta n \lambda(C)} \log\left(\frac{\Gamma\sqrt{n\log K}}{(1-\alpha_{max})\rho}\right)$$

with three constants $\psi_1, \psi_2$ and $c_1$. Here $\alpha_{max} = \max_{i \leq t \leq t_0} \alpha_t$.

Assumption 1 is mild, as most differential activation functions, e.g. softplus and sigmoid, satisfy it, and the Gaussian initialization is used in practice. It is assumed that Gaussian variance to be one for notation simplicity, but the technique is applicable to any constant variance. Assumption 2 requires that the discrepancy between $\alpha_t$ and $\alpha_{t+1}$ until some iteration number $t_0$ are bounded, which holds by setting proper $\alpha_t$. For $\lambda(C)$, prior works empirically and theoretically show $\lambda(C) > 0$. Based on the assumptions, we state our results in Theorem 2 with constants $c_1 \sim c_6$.

Theorem 2. Assume $\{(x_i, y_i)\}_{i=1}^n$ is a $(\rho, \varepsilon, \delta)$-corrupted dataset with noiseless labels $\{y_i^*\}_{i=1}^n$. Let $$\xi = \log\left(\frac{\Gamma\sqrt{n\log K}}{\rho}\right).$$

Suppose $\varepsilon$ and the number k of hidden nodes satisfy $$\varepsilon \leq c_2 \min\left(\frac{\lambda(C)}{K\Gamma^2\xi^6}, \frac{\rho}{\alpha_{max}}\right), k \geq \frac{c_3 K^2 \Gamma^{10} \xi^6 \|C\|^4}{\alpha_{max}^2 \lambda(C)^4}.$$

Let $$\psi' = 1 + \frac{\psi_1}{2} + \sqrt{\psi_2}.$$

If step size $$\eta \leq \frac{K}{2c_{up} n \Gamma^2 \|C\|^2},$$

with probability $1 - 3/K^{100} - K\exp(-100d)$, after $$t_0 = \frac{c_4 K}{\eta n \lambda(C)} \log\left(\frac{\Gamma\sqrt{n\log K}}{(1-\alpha_{max})\rho}\right)$$

iterations, the gradient descent (7) satisfies:
(1) The discrepancy between the label $\bar{y}^t$ estimated by our refinery (5) and the true label $y^*$ of data $\{x_i\}_{i=1}^n$ is bounded:

$$\frac{1}{\sqrt{n}} \|\bar{y}^t - y^*\|_2 \leq \frac{1-\alpha_t}{\sqrt{n}} \|y - y^*\|_2 + \alpha_t \zeta,$$

where $\zeta = 4\rho + c_5 \varepsilon \psi' K \Gamma^3 \xi \sqrt{\log K}/\lambda(C)$, $y^* = [y_1^*, \ldots, y_n^*]$. Moreover, if $$\rho \leq \frac{\delta}{32}, \varepsilon \leq c_6 \delta \min\left(\frac{\lambda(C)^2}{\psi' \Gamma^5 K^2 \xi^3}, \frac{1}{\Gamma\sqrt{d}}\right), 1 - \frac{3}{4}\delta \leq \alpha_t$$

the estimated label $\bar{y}^t$ predicts true label $y_i^*$ of any crop $x_i$: $\gamma_{k^*} = y_i^*$ with $k^* = \mathrm{argmin}_{i \leq k \leq \bar{K}} |\bar{y}_i^t - \gamma_k|$.
(2) By using the refined label $\bar{y}^t$ in (5) to train network, the error of network prediction on $\{x_i\}_{i=1}^n$ is upper bounded $$\frac{1}{\sqrt{n}} \|f(W_t, X) - y^*\|_2 \leq \zeta,$$

where $f(W_t, X) = [f(W_t, x_1), \ldots, f(W_t, x_n)]$. If assumptions on $\rho$ and $\varepsilon$ in (1) hold, for vanilla sample $c_k$ ($\forall k=1 \ldots K$), network $f(W_t, \cdot)$ predicts the true semantic label $\gamma_k$ of its any augmentation x that obeys $\|x - c_k\|_2 \leq \varepsilon_i : \gamma_{k^*} = \gamma_k$ with $k^* = \mathrm{argmin}_{i \leq i \leq \bar{K}} |f(W_t, x) - \gamma_i|$.

The first part result in Theorem 2 shows that after training iterations $t_0$, the discrepancy between the label $\bar{y}^t$ estimated by the label refinery and ground truth label $y^*$ of cropped training data $\{x_i\}_{i=1}^n$ is upper bounded by $\mathcal{O}(\|y-y^*\|_2 + \zeta)$. Both factors $\|y-y^*\|_2$ and $\rho$ in the factor $\zeta$ reflect the label error of the provided corrupted label y. Another important factor in is the smallest eigenvalue $\lambda(C)$ of network covariance matrix $\Sigma(C)$ in Assumption 2. Typically, the performance of a network heavily relies on the data diversity even without label corruption. For instance, if two samples are nearly the same but have different labels, then the learning of a network is difficult. $\lambda(C)$ can quantify this data diversity, as one can think of $\lambda(C)$ as a condition number associated with the network which characterizes the diversity of the vanilla samples $\{c_i\}_{i=1}^n$. Intuitively, if there are two similar vanilla samples, $\Sigma(C)$ is trivially rank deficient and the minimum eigenvalue of $\Sigma(C)$ is small, meaning more challenges for distinguishing the augmentations x generated from $c_i$. Otherwise, the more distinct the vanilla samples, the larger $\lambda(C)$ is and the smaller label error is $\zeta$. Moreover, when the label corruption ratio $\rho$ and the augmentation distance ε are small, the label $\bar{y}_i^t$, estimated by the label refinery can predict the true semantic label $y_i^*$ for any crop sample $x_i$, and thus can supervise a network to learn the essential semantic-class knowledges of augmentation samples $\{x_i\}_{i=1}^n$.

The second result in Theorem 2 shows that by using the refined label $\bar{y}^t$ in Eqn. (5) to train network $f(W,\cdot)$, the error of network prediction on augmentations $\{x_i\}_{i=1}^n$ can be upper bounded by $\zeta$. Similarly, the factor $\rho$ and $\lambda(C)$ in $\zeta$ respectively reflect the initial label error and the data diversity, which both reflect the learning difficulty for a model on the augmentation data $\{(x_i,y_i)\}_{i=1}^n$. More importantly, the results also guarantee the test performance of the trained network $f(W_t,\cdot)$. Specifically, when the label corruption ratio $\rho$ and sample augmentation distance ε are small, for any vanilla sample $c_k$ ($\forall k=1 \ldots K$), the network $f(W_t,\cdot)$ trained by the label refinery can exactly predict the true semantic label $\gamma_k$ of its any augmentation x (i.e. $\|x-c_k\|_2 \le ε$). These results accord with the results in Theorem 1 that shows the more accurate of training labels, the better generalization of the trained network. These results show the effectiveness of the refined labels by the method.

Some examples of computing devices, such as computing device 100 may include non-transitory, tangible, machine readable media that include executable code that when run by one or more processors (e.g., processor 110) may cause the one or more processors to perform the processes of method 300. Some common forms of machine readable media that may include the processes of method 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for training a machine learning model for detecting objects in an image, the method comprising:
   receiving, via a communication interface, a training batch of images;
   generating, by one or more processors, a first image query sample and a first positive instance corresponding to the first image query sample by randomly augmenting a same training image from the training batch into two views;
   encoding the first image query sample, the first positive instance, and a set of positive instances and negative instances generated from the training batch into respective high-dimensional feature representations;
   computing a first instance probability distribution based on a first semantic similarity between a first high-dimensional feature representation of the first positive instance and second high-dimensional feature representations of the set of positive instances and negative instances generated from the training batch;
   removing the first positive instance from the set of positive instances and negative instances;
   computing a second instance probability distribution based on a second semantic similarity between the first high-dimensional feature representation of the first positive instance and third high-dimensional feature representations corresponding to remaining instances in the set of positive instances and negative instances;
   generating, for the first image query sample, a first self-label by combining a first one-hot label of the first image query sample, the first instance probability distribution and the second instance probability distribution;
   generating, by a machine learning model implemented on the one or more processors, an encoded output based on a contrastive input of the set of positive instances and negative instances;
   computing a contrastive loss objective based on the encoded output supervised by the generated first self-label;
   training the machine learning model implemented on the one or more processors based on the contrastive loss objective; and
   performing, by the trained machine learning model implemented on the one or more processors, an object detection task on an image.

2. The method of claim 1, wherein the set of positive instances and negative instances is obtained by:
   generating a first number of positive instances corresponding to query samples in the training batch; and
   generating a second number of negative instances corresponding to query samples in the training batch, wherein the second number is greater than the first number.

3. The method of claim 1, wherein the first instance probability distribution is computed by:
   computing a similarity metric between the first positive instance and a first instance in the set of positive instances and negative instances; and dividing the similarity metric by a sum of all similarity metrics over all instances in the set of positive instances and negative instances.

4. The method of claim 3, wherein the similarity metric is computed by:
encoding, by an online network of the machine learning model, the first query sample into a first feature representation;
encoding, by a target network of the machine learning model, the first instance into an encoded instance; and
computing an exponential similarity between the first feature representation and the encoded instance in an encoded space.

5. The method of claim 1, wherein the first self-label is generated by a linear combination with a first weight and a second weight, and the method comprises:
determining the first weight based on a first maximum probability among probability entries of the first instance probability distribution; and
determining the second weight based on a second maximum probability among probability entries of the second instance probability distribution.

6. The method of claim 1, further comprising:
constructing a virtual query sample by a first linear combination of the first query sample and a second positive instance corresponding to a second query sample; and
constructing a virtual label by a second linear combination of the first self-label and a second self-label corresponding to the second query sample.

7. The method of claim 6, wherein the second positive instance is randomly sampled from the set of positive instances.

8. The method of claim 6, wherein the first or the second linear combination includes a weight that is randomly sampled according to Beta distribution.

9. The method of claim 6, further comprising:
computing the contrastive loss objective supervised by the virtual label.

10. The method of claim 1, wherein the contrastive loss objective is computed as a cross-entropy between the first self-label and a similarity metric of the first query sample to the set of positive instances and negative instances.

11. A system for training a machine learning model for detecting objects in an image, the system comprising:
a communication interface that receives a training batch of images;
a memory storing a machine learning model and a plurality of processor-executable instructions; and
one or more processors executing the plurality of processor-executable instructions to perform operations comprising:
generating a first image query sample and a first positive instance corresponding to the first image query sample by randomly augmenting a same training image from the training batch into two views;
encoding the first image query sample, the first positive instance, and a set of positive instances and negative instances generated from the training batch into respective high-dimensional feature representations;
computing a first instance probability distribution based on a first semantic similarity between a first high-dimensional feature representation of the first positive instance and second high-dimensional feature representations of the set of positive instances and negative instances generated from the training batch;
removing the first positive instance from the set of positive instances and negative instances;
computing a second instance probability distribution based on a second semantic similarity between the first high-dimensional feature representation of the first positive instance and third high-dimensional feature representations corresponding to remaining instances in the set of positive instances and negative instances;
generating, for the first image query sample, a first self-label by combining a first one-hot label of the first image query sample, the first instance probability distribution and the second instance probability distribution;
generating, by the machine learning model, an encoded output based on a contrastive input of the set of positive instances and negative instances;
computing a contrastive loss objective based on the encoded output supervised by the generated first self-label;
training the machine learning model based on the contrastive loss objective; and
performing, by the trained machine learning model, and object detection task on an image.

12. The system of claim 11, wherein the set of positive instances and negative instances is obtained by:
generating a first number of positive instances corresponding to query samples in the training batch; and
generating a second number of negative instances corresponding to query samples in the training batch, wherein the second number is greater than the first number.

13. The system of claim 11, wherein the first instance probability distribution is computed by:
computing a similarity metric between the first positive instance and a first instance in the set of positive instances and negative instances; and
dividing the similarity metric by a sum of all similarity metrics over all instances in the set of positive instances and negative instances.

14. The system of claim 13, wherein the similarity metric is computed by:
encoding, by a feature encoder of the machine learning model, the first query sample into a first feature representation;
encoding, by a projection head of the machine learning model, the first instance into an encoded instance; and
computing an exponential similarity between the first feature representation and the encoded instance in an encoded space.

15. The system of claim 11, wherein the first self-label is generated by a linear combination with a first weight and a second weight, and the operations further comprise:
determining the first weight based on a first maximum probability among probability entries of the first instance probability distribution; and
determining the second weight based on a second maximum probability among probability entries of the second instance probability distribution.

16. The system of claim 11, wherein the operations further comprise:
constructing a virtual query sample by a first linear combination of the first query sample and a second positive instance corresponding to a second query sample; and constructing a virtual label by a second linear combination of the first self-label and a second self-label corresponding to the second query sample.

17. The system of claim 16, wherein the second positive instance is randomly sampled from the set of positive instances.

18. The system of claim 16, wherein the first or the second linear combination includes a weight that is randomly sampled according to Beta distribution.

19. The system of claim 16, wherein the operations further comprise:
   computing the contrastive loss objective supervised by the virtual label.

20. The system of claim 11, wherein the contrastive loss objective is computed as a cross-entropy between the first self-label and a similarity metric of the first query sample to the set of positive instances and negative instances.

\* \* \* \* \*